United States Patent
Shi

(10) Patent No.: US 11,352,295 B2
(45) Date of Patent: Jun. 7, 2022

(54) COMPOSITE BLAST FURNACE MINERAL POWDER AND SYNTHETIC MATERIAL MADE FROM SAME

(71) Applicant: GUANGDONG PHOMI MCM CO., LTD., Guangzhou (CN)

(72) Inventor: Lei Shi, Guangzhou (CN)

(*) Notice: Subject to any disclaimer, the term of this patent is extended or adjusted under 35 U.S.C. 154(b) by 881 days.

(21) Appl. No.: 16/185,135

(22) Filed: Nov. 9, 2018

(65) Prior Publication Data

US 2019/0077709 A1    Mar. 14, 2019

Related U.S. Application Data

(62) Division of application No. 14/427,799, filed as application No. PCT/CN2013/084013 on Sep. 23, 2013, now Pat. No. 10,155,694.

(30) Foreign Application Priority Data

May 21, 2013  (CN) .......................... 201310191090.2
May 21, 2013  (CN) .......................... 201310191117.8

(51) Int. Cl.

| | |
|---|---|
| C04B 26/06 | (2006.01) |
| C04B 14/10 | (2006.01) |
| C04B 18/14 | (2006.01) |
| C04B 14/30 | (2006.01) |
| C04B 24/42 | (2006.01) |
| C04B 40/00 | (2006.01) |
| C04B 14/06 | (2006.01) |
| C04B 24/26 | (2006.01) |
| C04B 14/42 | (2006.01) |
| C04B 16/06 | (2006.01) |
| C04B 40/02 | (2006.01) |
| C04B 28/08 | (2006.01) |
| C04B 103/54 | (2006.01) |
| C04B 103/65 | (2006.01) |
| C04B 111/28 | (2006.01) |

(52) U.S. Cl.
CPC .............. *C04B 26/06* (2013.01); *C04B 14/06* (2013.01); *C04B 14/10* (2013.01); *C04B 14/308* (2013.01); *C04B 14/42* (2013.01); *C04B 16/0641* (2013.01); *C04B 18/14* (2013.01); *C04B 18/141* (2013.01); *C04B 24/2641* (2013.01); *C04B 24/42* (2013.01); *C04B 28/08* (2013.01); *C04B 40/0071* (2013.01); *C04B 40/0263* (2013.01); *C04B 2103/54* (2013.01); *C04B 2103/65* (2013.01); *C04B 2111/28* (2013.01); *Y02W 30/91* (2015.05)

(58) Field of Classification Search
CPC ..... C04B 28/08; C04B 40/0263; C04B 24/42; C04B 40/0071; C04B 16/0641; C04B 24/2641; C04B 18/141; C04B 26/06; C04B 14/06; C04B 14/308; C04B 14/42; C04B 18/14; C04B 14/10; C04B 2103/54; C04B 2103/65; C04B 2111/28; Y02W 30/94; Y02W 30/91

See application file for complete search history.

(56) References Cited

FOREIGN PATENT DOCUMENTS

| | | |
|---|---|---|
| CN | 1513796 A | 7/2004 |
| CN | 101709187 A | 5/2010 |
| CN | 103265226 A | 8/2013 |
| CN | 103288405 A | 9/2013 |

*Primary Examiner* — Angela C Scott
(74) *Attorney, Agent, or Firm* — Novoclaims Patent Services LLC

(57) ABSTRACT

A composite blast furnace mineral powder and a synthetic material made from same. The composite blast furnace mineral powder consists of the following materials in percentage by mass: 40-98.4% of blast furnace mineral powder, 7-20% of acrylic polymer emulsion or 1.5-3% of redispersible latex powder, 0.1-2% of fiber, 0-3% of pigment and the balance of filler. The composite blast furnace mineral powder can be pressed into a profile or a brick blank.

6 Claims, No Drawings

COMPOSITE BLAST FURNACE MINERAL POWDER AND SYNTHETIC MATERIAL MADE FROM SAME

CROSS-REFERENCE TO RELATED APPLICATIONS

This patent application is a divisional application of U.S. patent application Ser. No. 14/427,799 filed on Mar. 12, 2015 and which claims priority to International Application No. PCT/CN2013/084013, filed on Sep. 23, 2013 claiming the priority of CN 201310191090.2, filed on May 21, 2013 and CN 201310191117.8, filed on May 21, 2013, the content of each of which is incorporated by reference herein.

TECHNICAL FIELD OF THE INVENTION

The present invention relates to the field of composite material, especially to composite blast furnace mineral powder and synthetic materials made from same.

BACKGROUND ART

Blast furnace mineral powder is a mineral admixture with potential activity, which can be prepared from pulverizing granulated water quenching blast furnace slag to achieve a specified fineness, and has the features of ultrafine particles and larger activity when its surface area is above 400 $m^2$/Kg. At present blast furnace mineral powder is mainly used as admixture to replace part of cement, and is one of the composite materials for the production of high strength concrete. But the application field of the blast furnace mineral powder is still more limited, and the approach of the resource utilization is insufficient. Therefore, there is very practical significance on how to manufacture the material with high additional value by taking advantage of the blast furnace mineral powder with low value.

SUMMARY OF THE INVENTION

The present invention is aimed to provide a composite blast furnace mineral powder and synthetic material made from the same. To solve the above problems, technical scheme adopted by the present invention is described as follows:

a composite blast furnace mineral powder, which consists of following components as raw materials in percentage by mass: 40-98.4% of blast furnace mineral powder, 7-20% of acrylic polymer emulsion or 1.5-3% of redispersible latex powder, 0.1-2% of polyvinyl alcohol fiber, 0-3% of pigment and the balance of filler.

A composite blast furnace mineral powder, characterized in that: it consisting of following components as raw materials in percentage by mass: 30-60% of a blast furnace mineral powder, 7-20% of an acrylic polymer emulsion, 0.1-2% of fiber, 0.1-5% of hydrophobic agent, 0-3% of a pigment and the balance is a filler.

A composite blast furnace mineral powder, characterized in that: it consisting of following components as raw materials in percentage by mass: 30-60% of a blast furnace mineral powder, 7-20% of an acrylic polymer emulsion, 0.1-2% of fiber, 0.1-5% of hydrophobic agent, 0-3% of a pigment and the balance is a filler.

Preferably, blast furnace mineral powder is granulated blast furnace water quenching superfine mineral powder.

Preferably, specific surface area of blast furnace mineral powder is not less than 410 m2/kg. The blast furnace mineral powder may be blast furnace mineral powder of S95 or higher level on the market.

Preferably, solid content of the acrylic polymer emulsion is 45-55%. The amount of the emulsion needs to increase correspondingly as solid content is lowered.

Preferably, the fiber is at least one of glass fiber, polyvinyl alcohol fiber, and the better is high strength and high modulus polyvinyl alcohol fiber.

Preferably, the filler is at least one of quartz sand, mountain flour, porcelain slag powder and clay.

Preferably, the hydrophobic agent is organosilicons hydrophobic agent.

The achieved composite blast furnace mineral powder of the present invention may be further processed into sheet material, profiled material or brick embryo to obtain a synthetic material, its manufacturing method is as follows:
1) pressing the prepared composite blast furnace mineral powder of the invention by 800-10000 ton press into sheet material, profiled material or brick embryo;
2) drying at room temperature or stoving at 50-180° C., to obtain synthetic material.

Wherein the synthetic material served as sheet material can be used to replace cement based fiber sheet and; the synthetic material served as brick embryo can also be glazed on the brick embryo thereof, and dried and molded; and the synthetic material served as profile material can take the place of the plastic profile material, plaster profile material and metal profile material.

Or a preparation method of the synthetic material, comprises the following steps:
1) adding water into the foregoing composite blast furnace mineral powder, and mixing evenly, to obtain slurry;
2) coating, injecting and extruding the slurry onto the mold, and demolding after curing, to obtain a flexible synthetic material.

The beneficial effects of the present invention are described as follows:

Granulated water quenching blast furnace mineral powder is prepared from grinding rapidly cooled liquid molten steel slag, most of which is glassy substance, the glassy body has very low degree of polymerization and has activity, and the activity of the mineral powder can be greatly increased when its specific surface area is above 410 $m^2$/Kg. In addition to a large amount of glassy body, the mineral powder also contains calcium and magnesium aluminate melilite and a very small amount of crystalline such as calcium silicate and calcium silicate, Therefore, mineral powder itself has weak hydraulicity. The composite blast furnace mineral powder of the present invention can recycle the waste to improve the comprehensive use of the resource.

The sheet material prepared from the composite blast furnace mineral powder according to the present invention can take the place of fiber cement board and block board. The high strength and high modulus polyvinyl alcohol fiber used in the present invention has the characterics of anti-flexural strength, anti-impact strength and high toughness. The high strength and high modulus polyvinyl alcohol fiber also has the properties of resistance to chemical corrosion, resistance to microbes and excellent water conductivity. Therefore, compared with fiber cement board, the achieved sheet material prepared from the composite blast furnace mineral powder of the present invention has the advantages of environment-friendliness and better mechanical properties like toughness and anti-impact strength, and can be manufactured in one-step forming without autoclaving; and compared with plywood, the achieved sheet material made from the dry powder of the present invention has the advantages of fireproof property of A class, very low content of the volatile organic compounds like released formaldehyde and saved timber resources.

The sheet material prepared from the composite blast furnace mineral powder according to the present invention can take the place of plastic profile material, plaster profile material and metal profile material.

The brick embryo prepared from the composite blast furnace mineral powder of the present invention can be made into non-sintered ceramic tile and artificial stone, with surface glazed and dried and molded. The ceramic tile can save a lot of energy source and reduce pollution emissions as it doesn't need sintering.

Because of the light mass and certain flexibility, flexible sheet material is an ideal decorative material for high-rise thermal insulation system. Flexible decorative sheet material reported mainly has three types: flexible tiles made from colorful sand and emulsion, the same ingredients with stone paint clay or cement based flexible sheet Due to the fireproof property of flexible tiles and clay-based flexible sheet can not reach class A, and their relatively weak anti-aging, their usage is limited. while the cement based flexible sheet material can almost impossibly overcome the common fault of "crystalline bloom" of the cement based material, Although several anti-crystalline bloom products has been developed by some companies, but the effect is unsatisfied in the practical application.

In the case of adding a small amount of an acrylic polymer as a crosslinking agent, the composite blast furnace mineral powder based flexible synthetic material can totally use the blast furnace mineral powder with specific surface area exceeding 410 m2/Kg as an inorganic cementitious material, form decorative sheet material with good waterproof property and high surface hardness, and can reduce the cost. And most importantly, it can avoid crystalline bloom phenomenon of the conventional cement based flexible sheet material. Replacing the cement based system with mineral powder, which can reduce the application amount of the acrylic acid polymer, and endow it better anti-aging property. Moreover, compared with the cement based flexible decorative sheet material, the flexible decorative sheet material according to the present invention has better glaze material absorptivity and make the color more firmly when a secondary glazing treatment for the surface is needed.

The flexible decorative sheet material of the present invention utilizes blast furnace mineral powder which belongs to waste to produce decorative material with high additional value, which can achieve the purpose of turning waste into treasure.

DETAILED DESCRIPTION OF THE EMBODIMENTS

A composite blast furnace mineral powder, which consists of following components as raw materials in percentage by mass: 40-98.4% of blast furnace mineral powder, 7-20% of acrylic polymer emulsion or 1.5-3% of redispersible latex powder, 0.1-2% of polyvinyl alcohol fiber, 0-3% of a pigment and the balance of filler.

A composite blast furnace mineral powder, characterized in that: it consisting of following components as raw materials in percentage by mass: 30-60% of blast furnace mineral powder, 7-20% of acrylic polymer emulsion, 0.1-2% of fiber, 0.1-5% of hydrophobic agent, 0-3% of pigment and the balance of filler.

Preferably, the blast furnace mineral powder is granulated blast furnace water quenching superfine mineral powder.

Preferably, specific surface area of the blast furnace mineral powder is not less than 410 $m^2$/kg. The blast furnace mineral powder may be blast furnace mineral powder of S95 or higher level on the market.

Preferably, solid content of the acrylic polymer emulsion is 45-55%. The amount of the emulsion needs to increase correspondingly as solid content is lowered.

Preferably, the fiber is at least one of glass fiber, polyvinyl alcohol fiber, the polyvinyl alcohol fiber is further high strength and high modulus polyvinyl alcohol fiber.

Preferably, the filler is at least one of quartz sand, mountain meal, porcelain slag powder and clay.

Because blast furnace mineral powder has inferior anti-permeability than cement after curing, therefore hydrophobic agent is needed to be added, which can reduce water absorption and reinforce anti-permeability. Preferably, the hydrophobic agent is organosilicons hydrophobic agent.

Preferably, the pigment is mineral pigment with more stable chemical properties, such as iron oxides pigment. The achieved composite blast furnace mineral powder of the present invention may be further processed into sheet material, profiled material or brick embryo to obtain a synthetic material, its manufacturing method is described as follows:
1) pressing the prepared composite blast furnace mineral powder of the invention by 800-10000 ton press into sheet material, profiled material or brick embryo;
2) drying at room temperature or stoving at 50-180° C., to obtain synthetic material.

Wherein the synthetic material served as sheet material can be used to replace cement based fiber sheet and wood board; the synthetic material served as brick embryo can also be glazed on the brick embryo thereof, and dried and molded; and the synthetic material served as profile material can take the place of the plastic profile material, plaster profile material and metal profile material.

Or a preparation method of the synthetic material, comprises the following steps:
1) adding water into the foregoing composite blast furnace mineral powder, and mixing evenly, to obtain slurry;
2) coating, injecting and extruding the slurry onto the mold, and demolding after curing, to obtain a flexible synthetic material.

Further description of the present invention will be made as follows in connection with the specific embodiments, but it is not intended to be limited therein.

The percentage used in the embodiments, if no special instructions, refers to the mass percentage. Blast furnace mineral powder in the embodiments is S95 from Capital Iron and Steel Plant, and the acrylic polymer emulsion is M-8504 from Guangzhou Mi Run Gao Chemical Co., Ltd.

Embodiment 1 a composite blast furnace mineral powder, which consists of following components as raw materials in percentage by mass: 45% of blast furnace mineral powder, 7% of acrylic polymer emulsion (Guangzhou Mi Run Gao Chemical Co., Ltd. M-8504, solid content 48%), 0.5% of high strength and high modulus polyvinyl alcohol fiber (Anhwei WanWei Group), and the balance of quartz sand.

The preparation method of the composite blast furnace mineral powder comprises following steps:
1) adding 12% of water into the acrylic polymer emulsion, stirring evenly, to obtain mixed polymer suspension;

2) mixing the pulverized quartz sand with remaining raw material, then adding them into mixed polymer suspension, stirring to form homogeneous paste, standing 2 h, and dehydrating to moisture content of 8%, to obtain composite blast furnace mineral powder. Pressing the achieved dry powder by 3000 ton press into sheet material, drying at 80° C., trimming, and manufacturing into finished product, to obtain synthetic material.

Embodiment 2 a composite blast furnace mineral powder, which consists of following components as raw materials in percentage by mass: 45% of blast furnace mineral powder, 9% of acrylic polymer emulsion (Zhongshan Sanjian Synthetic Material Co., Ltd. 715, solid content 45%), 0.8% of high strength and high modulus polyvinyl alcohol fiber (KURARAY), and the balance of mountain meal.

The preparation method of the composite blast furnace mineral powder comprises following steps:
1) adding 12% of water into the acrylic polymer emulsion, stirring evenly, to obtain mixed polymer suspension;
2) mixing the pulverized mountain meal with remaining raw material, then adding them into mixed polymer suspension, stirring to form homogeneous paste, standing 2 h, dehydrating to moisture content of 10%, to obtain composite blast furnace mineral powder.

Pressing the achieved dry powder by 6000 ton press into sheet material, drying at 60° C., trimming, and manufacturing into finished product, to obtain synthetic material.

Embodiment 3 a composite blast furnace mineral powder, which consists of following components as raw materials in percentage by mass: 50% of blast furnace mineral powder, 11% of acrylic polymer emulsion (Zhejiang XiLi Chemical Co., Ltd. XL-100A, solid content 50%), 1.2% of high strength and high modulus polyvinyl alcohol fiber (Anhwei WanWei Group), and the balance of porcelain slag powder.

The preparation method of the composite blast furnace mineral powder comprises following steps:
1) adding 10% of water into the acrylic polymer emulsion, stirring evenly, to obtain mixed polymer suspension;
2) mixing the pulverized porcelain slag powder with remaining raw material, then adding them into mixed polymer suspension, stirring to form homogeneous paste, standing 2 h, dehydrating to moisture content of 7%, to obtain composite blast furnace mineral powder. Pressing the achieved dry powder by 8000 ton press into sheet material, drying at 120° C., trimming, and manufacturing into finished product, to obtain synthetic material.

Embodiment 4 a composite blast furnace mineral powder, which consists of following components as raw materials in percentage by mass: 52% of blast furnace mineral powder, 13% of acrylic polymer emulsion (Guangzhou Mi Run Gao Chemical Co., Ltd. M-8504, solid content 52%), 1.4% of high strength and high modulus polyvinyl alcohol fiber (KURARAY), and the balance of mountain meal.

The preparation method of the composite blast furnace mineral powder comprises following steps:
1) adding 12% of water into the acrylic polymer emulsion, stirring evenly, to obtain mixed polymer suspension;
2) mixing the pulverized mountain meal with remaining raw material, then adding them into mixed polymer suspension, stirring to form homogeneous paste, standing 2 h, dehydrating to moisture content of 5%, to obtain composite blast furnace mineral powder.

Pressing the achieved dry powder by 10000 ton press into sheet material, drying at 150° C., trimming, and manufacturing into finished product, to obtain synthetic material.

Embodiment 5 a composite blast furnace mineral powder, which consists of following components as raw materials in percentage by mass: 60% blast furnace mineral powder, 18% of acrylic polymer emulsion (Zhongshan Sanjian Synthetic Material Co., Ltd. 715, solid content 45%), 0.1% of high strength and high modulus polyvinyl alcohol fiber (KURARAY), 0.5% of iron oxide yellow and the balance of clay.

The preparation method of the composite blast furnace mineral powder comprises following steps:
1) adding 5% of water into the acrylic polymer emulsion, stirring evenly, to obtain mixed polymer suspension;
2) mixing the pulverized clay with remaining raw material, then adding them into mixed polymer suspension, stirring to form homogeneous paste, standing 2 h, dehydrating to moisture content of 9%, to obtain composite blast furnace mineral powder.

The foregoing dry powder is injection molded, dried at room temperature, and demolded to form profile material, to obtain the synthetic material.

Embodiment 6 a composite blast furnace mineral powder, which consists of following components as raw materials in percentage by mass: 90% blast furnace mineral powder, 1.6% of redispersible latex powder (Wacker Chemie AG 5010N)), 0.2% of high strength and high modulus polyvinyl alcohol fiber (Anhwei WanWei Group), 0.2% of iron oxide red and the balance of quartz sand.

The preparation method of the composite blast furnace mineral powder comprises following steps:
1) adding 10% of water into the redispersible latex powder, stirring evenly, to obtain mixed polymer suspension;
2) mixing the pulverized quartz sand with remaining raw material, then adding them into mixed polymer suspension, stirring to form homogeneous paste, standing 2 h, dehydrating to moisture content of 10%, to obtain composite blast furnace mineral powder.

Embodiment 7 a composite blast furnace mineral powder, which consists of following components as raw materials in percentage by mass: 70% of blast furnace mineral powder, 11% of acrylic polymer emulsion (Antex Chemicals (Zhongshan) Ltd. 3201, solid content 45%), 0.8% of high strength and high modulus polyvinyl alcohol fiber (KURARAY), and the balance of quartz sand.

The preparation method of the composite blast furnace mineral powder comprises following steps:
1) adding 18% of water into the acrylic polymer emulsion, stirring evenly, to obtain mixed polymer suspension;
2) mixing the pulverized quartz sand with remaining raw material, then adding them into mixed polymer suspension, stirring to form homogeneous paste, standing 2 h, dehydrating to moisture content of 5%, to obtain composite blast furnace mineral powder.

Pressing the achieved dry powder by 3000 ton press into brick embryo, drying at 80° C., glazing and drying it to be shaped, to obtain synthetic material.

After the test, the performance test results of the sheet materials prepared in various embodiment, chrysotile cement based fiber sheet (using high-density asbestos cement fiberboard), block board (using lumber core) are shown in table 1. The table shows that the achieved sheet material made from the composite blast furnace mineral powder of the present invention has the mechanical properties similar to that of the chrysotile cement based fiber sheet and environmental-friendliness. Compared with the lumber core, the formaldehyde release amount of the achieved sheet material made from the composite blast furnace mineral powder of the present invention is much lower than common lumber core on the market, and the fireproof performance is also better than the lumber core.

emulsion (solid content 45%), 0.5% of polyvinyl alcohol fiber, 0.2% of hydrophobic agent (organosilicons hydrophobic agent 1042 produced by Wacker Chemie AG), and the balance of mountain meal.

The manufacturing method of the flexible decorative sheet material comprises following steps:

1) pulverizing mountain meal into 100-200 mesh, and mixing the pulverized mountain meal with S95 mineral powder, polyvinyl alcohol fiber, to obtain dry mixture;

2) adding hydrophobic agent into 15% of water, stirring evenly to form mixed suspension, adding the dry mixture thereinto, stirring evenly, then adding acrylic polymer emulsion, and stirring into uniform slurry;

3) extruding the slurry onto mold with wood grain, with a thickness of 4 mm, and demolding after curing at normal temperature, to obtain imitated wood grain product of the flexible decorative sheet material.

TABLE 1 performance test results of the sheet materials prepared in various embodiment

|  | Embodiment 1 | Embodiment 2 | Embodiment 3 | Embodiment 4 | chrysotile cement based fiber sheet | block board |
|---|---|---|---|---|---|---|
| Density (g/cm3) | 1.3 | 1.71 | 1.80 | 1.90 | 1.75 | / |
| water absorbing capacity, % | 12.2 | 8.1 | 8.2 | 6.0 | 5.8 | / |
| flexural strength (MPa) | 12.1 | 15.4 | 26.5 | 30.1 | 18.9 | / |
| anti-impact strength (KJ/m$^2$) | 1.2 | 2.0 | 2.2 | 2.2 | 1.8 | / |
| resistant to freezing and thawing | 25 cycles, no cracks, no delamination | 25 cycles, no cracks, no delamination | 25 cycles, no cracks, no delamination | 25 cycles, no cracks, no delamination | 25 cycles, no cracks, no delamination | / |
| moisture swelling efficiency, % | 0.18 | 0.10 | 0.16 | 0.06 | 0.08 | / |
| Formaldehyde release amount (mg/L) | 0.008 | 0.01 | 0.01 | 0.01 |  | 2.5 |
| Flammability | class A2 | class A2 | class A2 | class A2 | class A2 | class B |

Embodiment 8

A flexible decorative sheet material, which consists of following components as raw materials in percentage by mass: 30% of S95 mineral powder, 20% of acrylic polymer emulsion (solid content 45%), 0.1% of hydrophobic agent (hydrophobic agent B5 produced by Dongguan AoDa Chemical Plant), 0.1% of glass fiber, and the balance of quartz sand.

The manufacturing method of the flexible decorative sheet material comprises following steps:
1) pulverizing quartz sand into 100-200 mesh, and mixing the pulverized quartz sand with S95 mineral powder, glass fiber, to obtain dry mixture;
2) adding hydrophobic agent into 10% of water, stirring evenly to form mixed suspension, adding the dry mixture thereinto, stirring evenly, then adding acrylic polymer emulsion, and stirring into uniform slurry;
3) extruding the slurry onto mold with wood grain, with a thickness of 3 mm, and demolding after curing at 60° C., to obtain imitated wood grain product of the flexible decorative sheet material.

Embodiment 9

A flexible decorative sheet material, which consists of following components as raw materials in percentage by mass: 35% of S95 mineral powder, 16% of acrylic polymer Embodiment 10

A flexible decorative sheet material, which consists of following components as raw materials in percentage by mass: 40% of S95 mineral powder, 14% of acrylic polymer emulsion (solid content 48%), 1% of glass fiber, 0.5% of iron oxide red, 0.5% of hydrophobic agent (organosilicons hydrophobic agent 1042 produced by Wacker Chemie AG), and the balance of porcelain slag.

The manufacturing method of the flexible decorative sheet material comprises following steps:
1) pulverizing porcelain slag into 100-200 mesh, and mixing the pulverized porcelain slag powder with S105 mineral powder, glass fiber, to obtain dry mixture;
2) adding hydrophobic agent into 20% of water, stirring evenly to form mixed suspension, adding the dry mixture thereinto, stirring evenly, then adding acrylic polymer emulsion, and stirring into uniform slurry;
3) extruding the slurry onto mold with cowhide grain, with a thickness of 3 mm, and demolding after curing at 150° C., to obtain imitated cowhide grain product of the flexible decorative sheet material.

Embodiment 11

A flexible decorative sheet material, which consists of following components as raw materials in percentage by mass: 45% of S95 mineral powder, 0.3% of acrylic polymer emulsion (solid content 50%)), 0.8% of hydrophobic agent (hydrophobic agent B5 produced by DongGuan AoDa Chemical Plant), 0.5% of iron oxide yellow, and the balance of quartz sand.

The manufacturing method of the flexible decorative sheet material comprises following steps:
1) pulverizing quartz sand into 100-200 mesh, and mixing the pulverized quartz sand with S95 mineral powder, glass fiber, to obtain dry mixture;
2) adding hydrophobic agent into 25% of water, stirring evenly to form mixed suspension, adding the dry mixture thereinto, stirring evenly, then adding acrylic polymer emulsion, and stirring into uniform slurry;
3) extruding the slurry onto mold with cowhide grain, with a thickness of 3 mm, and demolding after curing at 150° C., to obtain imitated cowhide grain product of the flexible decorative sheet material.

Embodiment 12

A flexible decorative sheet material, which consists of following components as raw materials in percentage by mass: 50% of S95 mineral powder, 9% of acrylic polymer emulsion (solid content 52%), 1.0% of polyvinyl alcohol fiber, 1.5% of iron oxide red, 1.0% of hydrophobic agent (organosilicons hydrophobic agent B5 produced by Dong-Guan AoDa Chemical Plant), and the balance of quartz sand and porcelain slag powder with mass ratio of 1:1. The manufacturing method of the flexible decorative sheet material comprises following steps:
1) pulverizing quartz sand and porcelain slag powder into 100-200 mesh, mixing the pulverized quartz sand with S95 mineral powder and polyvinyl alcohol fiber, to obtain dry mixture;
2) adding hydrophobic agent into 28% of water, stirring evenly to form mixed suspension, adding the dry mixture thereinto, stirring evenly, then adding acrylic polymer emulsion, and stirring into uniform slurry;
3) coatings the slurry onto a glossy mold, with a thickness of 2.5 mm, and demolding after curing at 100° C., to obtain glossy product.

Embodiment 13

A flexible decorative sheet material, which consists of following components as raw materials in percentage by mass: 50% of S95 mineral powder, 7% of acrylic polymer emulsion (solid content 50%), 1.8% of iron oxide black, 1.4% of polyvinyl alcohol fiber, 2% of hydrophobic agent (organosilicons hydrophobic agent 6683 produced by Dow Corning), and the balance of mountain meal.

The manufacturing method of the flexible decorative sheet material comprises following steps:
1) pulverizing mountain meal into 100-200 mesh, and mixing the pulverized mountain meal with S95 mineral powder, polyvinyl alcohol fiber, to obtain dry mixture;
2) adding hydrophobic agent into 30% of water, stirring evenly to form mixed suspension, adding the dry mixture thereinto, stirring evenly, then adding acrylic polymer emulsion, and stirring into uniform slurry;
3) coatings the slurry onto a mold with split tiles grain, with a thickness of 2 mm, and demolding after curing at 80° C., to obtain imitated split tiles product.

Embodiment 14 a composite blast furnace mineral powder, which consists of following components as raw materials in percentage by mass: 60% blast furnace mineral powder, 18% of acrylic polymer emulsion (Zhongshan Sanjian Synthetic Material Co., Ltd. 715, solid content 45%), 0.3% of glass fiber, 0.2% of iron oxide yellow, and the balance of clay.

The preparation method of the composite blast furnace mineral powder comprises following steps:
1) adding 5% of water into the acrylic polymer emulsion, stirring evenly, to obtain mixed polymer suspension;
2) mixing the pulverized clay with remaining raw material, then adding them into mixed polymer suspension, stirring to form homogeneous paste, standing 2 h, dehydrating to moisture content of 9%, to obtain composite blast furnace mineral powder.

The foregoing dry powder is injected into a mold, dried at room temperature, and demolded to form profile material, to obtain the synthetic material.

Embodiment 15

A flexible decorative sheet material, which consists of following components as raw materials in percentage by mass: 35% of S95 mineral powder, 16% of acrylic polymer emulsion (solid content 48%), 0.5% of glass fiber, 0.2% of hydrophobic agent (organosilicons hydrophobic agent 1042 produced by Wacker Chemie AG), and the balance of mountain meal.

The manufacturing method of the flexible decorative sheet material comprises following steps:
1) pulverizing the mountain meal into 100-200 mesh, and mixing the pulverized mountain meal with S95 mineral powder, polyvinyl alcohol fiber, to obtain dry mixture;
2) adding hydrophobic agent into 15% of water, stirring evenly to form mixed suspension, adding the dry mixture thereinto, stirring evenly, then adding acrylic polymer emulsion, and stirring into uniform slurry;
3) extruding the slurry onto mold with wood grain, with a thickness of 4 mm, and demolding after curing, to obtain imitated wood grain product of the flexible decorative sheet material.

Comparative Example 1

Cement based flexible decorative sheet material, which consists of following components as raw materials in percentage by mass: 45% of white cement, 10% of acrylic polymer emulsion (solid content 45%), 0.3% of glass fiber, 0.8% of hydrophobic agent (hydrophobic agent B5 produced by DongGuan AoDa Chemical Plant), 0.5% of iron oxide yellow, and the balance of quartz sand, and the preparation method thereof is similar to that described in the embodiment 4, wherein merely the mineral powder is replaced with cement.

Comparative Example 2

Cement based flexible decorative sheet material, which consists of following components as raw materials in percentage by mass: 45% of white cement, 12% of acrylic polymer emulsion (solid content 45%), 0.3% of glass fiber, 0.5% of hydrophobic agent (hydrophobic agent B5 produced by DongGuan AoDa Chemical Plant), 0.5% of iron oxide yellow, and the balance of quartz sand, and the preparation method thereof is similar to that described in the embodiment 4, wherein merely the mineral powder is replaced with cement, and the content of the acrylic polymer emulsion is increased.

Comparative Example 3

In the patent of ZL200910226004.0 entitled "modified ordinary mud based elastomer products and production methods thereof", modified mud and acrylic polymer emulsion are adopted to prepare elastic ground/wall brick. Wherein, acrylic acid is in the range of 20%-70%. 71% of modified yellow mud powder, 20% of acrylic esters macromolecule copolymerization emulsion and 9% of water are mechanically blended and stirred into homogeneous composite slurry. The composite slurry is coated (coating thick of 1.6 mm) on the mold with wove grain, wood grain and stone grain, and baked at the temperature of 280° C., after the evaporation of the water, the composite mud ground/wall brick with yellow wove grain, wood grain and stone grain (thick of 1.6 mm) is produced.

The achieved flexible decorative sheet material in the embodiments 1-6 and the cement based flexible sheet material and the modified mud based flexible sheet material of the comparative examples of 1-3 are tested for performance, the results are shown in table 2. The table shows that in the case of the same amount of the acrylic acid emulsion, compared with the comparative example 1, the flexible decorative sheet material of the invention has the better flexibility by using blast furnace mineral powder to replace cement instead of the poor strength and easy crack of the comparative example 1. And compared with the comparative example 2, the products of the invention has better fireproof performance and aging resistance performance.

TABLE 2 performance test results of the composite blast furnace mineral powder decorative sheet material in various embodiment.

| performance | Embodiment 8 | Embodiment 9 | Embodiment 10 | Embodiment 11 | Embodiment 12 | Embodiment 13 | Comparative Example 1 | Comparative Example 2 | Comparative Example 3 |
|---|---|---|---|---|---|---|---|---|---|
| crystalline bloom | no crystalline bloom | no crystalline bloom | no crystalline bloom | no crystalline bloom | no crystalline bloom | no crystalline bloom | Has crystalline bloom | Has crystalline bloom | no crystalline bloom |
| fireproof performance | class B1 | class B1 | class B1 | class A2 | class A2 | class A2 | class A2 | class A2 | class B2 |
| water absorbing capacity | 1.5% | 4.2% | 6.0% | 9% | 11% | 8% | 13.8% | 8.2% | 2.2% |
| tensile strength (MPa) | 10.1 | 8.5 | 7.2 | 1.5 | 3.8 | 4.2 | 0.4 | 1.0 | 8.6 |
| anti-aging property | 1200 h | 2000 h | 2500 h | 3500 h | 3500 h | 3500 h | 3500 h | 2500 h | 1200 h |
| Flexibility (wound around cylinder with diameter of 200 mm) | no cracks | no cracks | no cracks | no cracks | no cracks | no cracks | no cracks | no cracks | no cracks |

By adopting blast furnace slag for test, the test result proves that the blast furnace mineral powder synthetic material has wide application and excellent performance.

The invention claimed is:

1. A composite blast furnace mineral powder comprising, as raw materials in percentage by mass, 40-98.4% of blast furnace mineral powder, 7-20% of acrylic polymer emulsion, 0.1-2% of fiber, 0-3% of pigment and the balance of filler.

2. The composite blast furnace mineral powder according to claim 1, wherein the blast furnace mineral powder is granulated blast furnace water quenching superfine mineral powder.

3. The composite blast furnace mineral powder according to claim 1, wherein the specific surface area of the blast furnace mineral powder is not less than 410 $m^2$/kg.

4. The composite blast furnace mineral powder according to claim 1, wherein the solid content of the acrylic polymer emulsion is 45-55%.

5. The composite blast furnace mineral powder according to claim 1, wherein the filler is at least one of quartz sand, mountain meal, porcelain slag powder and clay.

6. The composite blast furnace mineral powder according to claim 1, wherein the fiber is a polyvinyl alcohol fiber.

* * * * *